United States Patent [19]

Weber et al.

[11] 3,882,769

[45] May 13, 1975

[54] EGG HANDLING SYSTEM

[76] Inventors: John R. Weber, 2102 Oak Crest Dr., Riverside, Calif. 92506; Richard L. Miller, Jr., 7460 Cabrillo Ave., La Jolla, Calif. 93501; David R. Copple, 459 W. 11th St., Claremont, Calif. 91711

[22] Filed: Dec. 7, 1971

[21] Appl. No.: 205,561

[52] U.S. Cl. .................. 99/484; 99/534; 99/487
[51] Int. Cl. ..................... A23b 5/06; A01k 43/00
[58] Field of Search .............. 99/484, 487, 517, 534

[56] References Cited
UNITED STATES PATENTS
2,184,063   12/1939   Meyer .............................. 99/517 X Primary Examiner—Peter Feldman
Assistant Examiner—Alan Cantor
Attorney, Agent, or Firm—R. S. Kelly; C. E. Tripp

[57] ABSTRACT

An in-line egg handling system which provides a means and method for automatically handling eggs from the time they are laid by the chickens to the time that they are packed in cartons or cases for delivery to distribution centers which system is designed so as to maintain a high level of egg quality. The system comprises, in series, a conventional conveyor belt egg gathering system, an accumulator and aligner to feed the bulk eggs into channels for controlled movement of the individual eggs thereafter, an orienter, an oiler, a washer, a cooling and conditioning apparatus, and a conventional grading and packing machine which includes means for applying a second oiling to the eggs just before they are packed.

10 Claims, 4 Drawing Figures

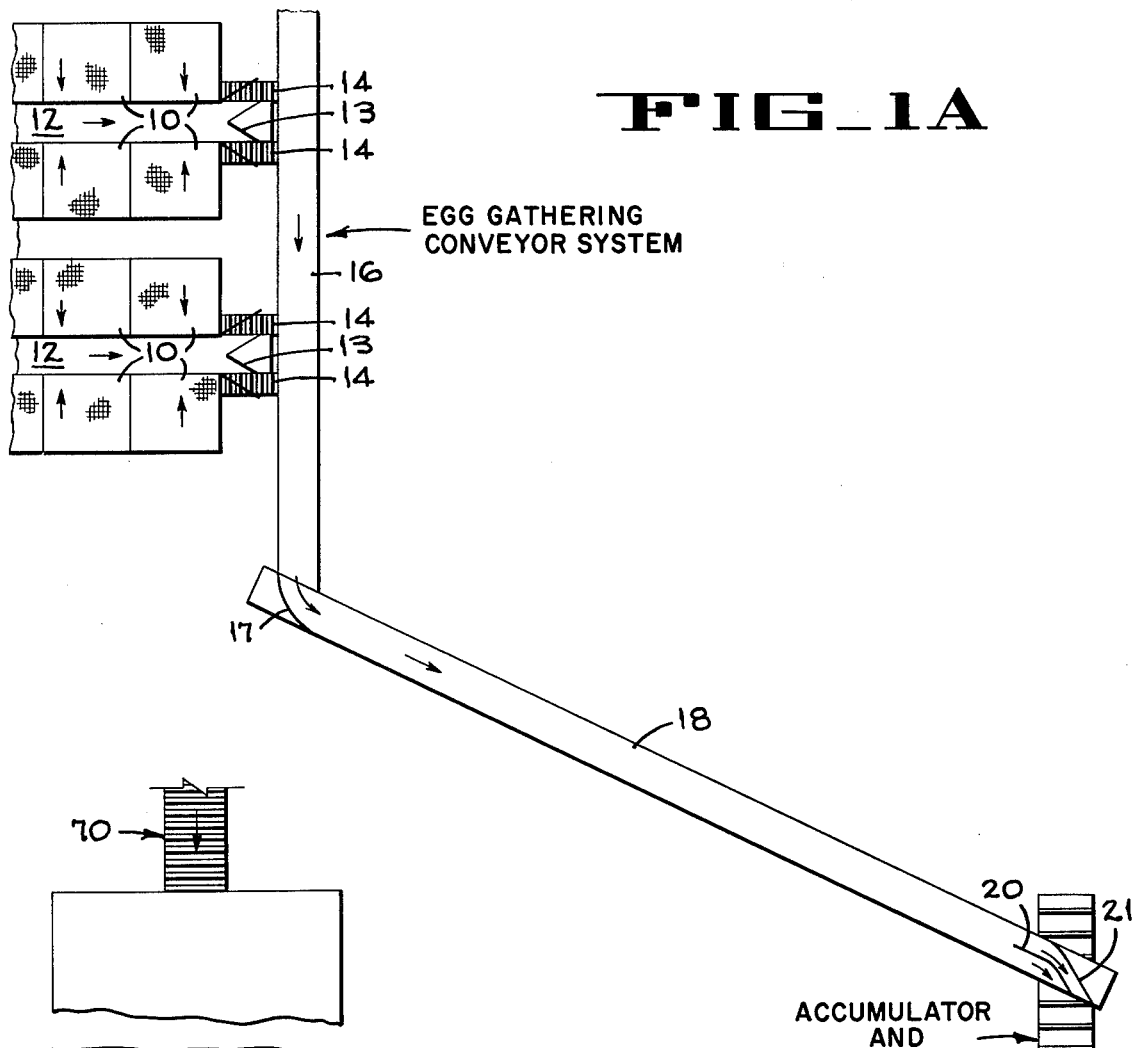
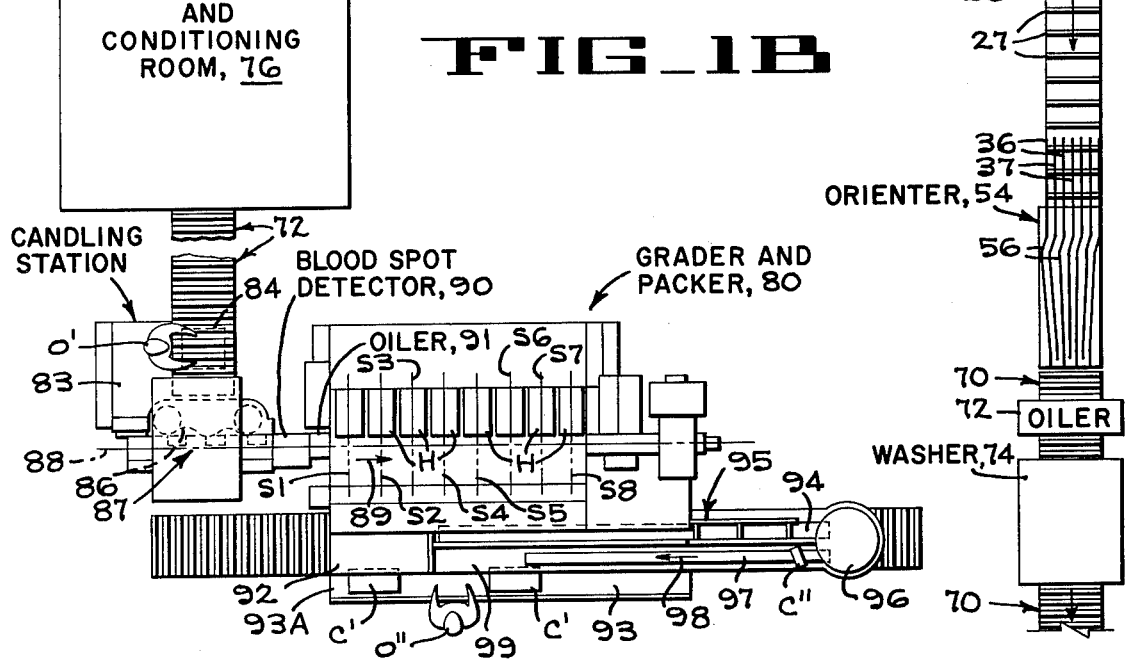

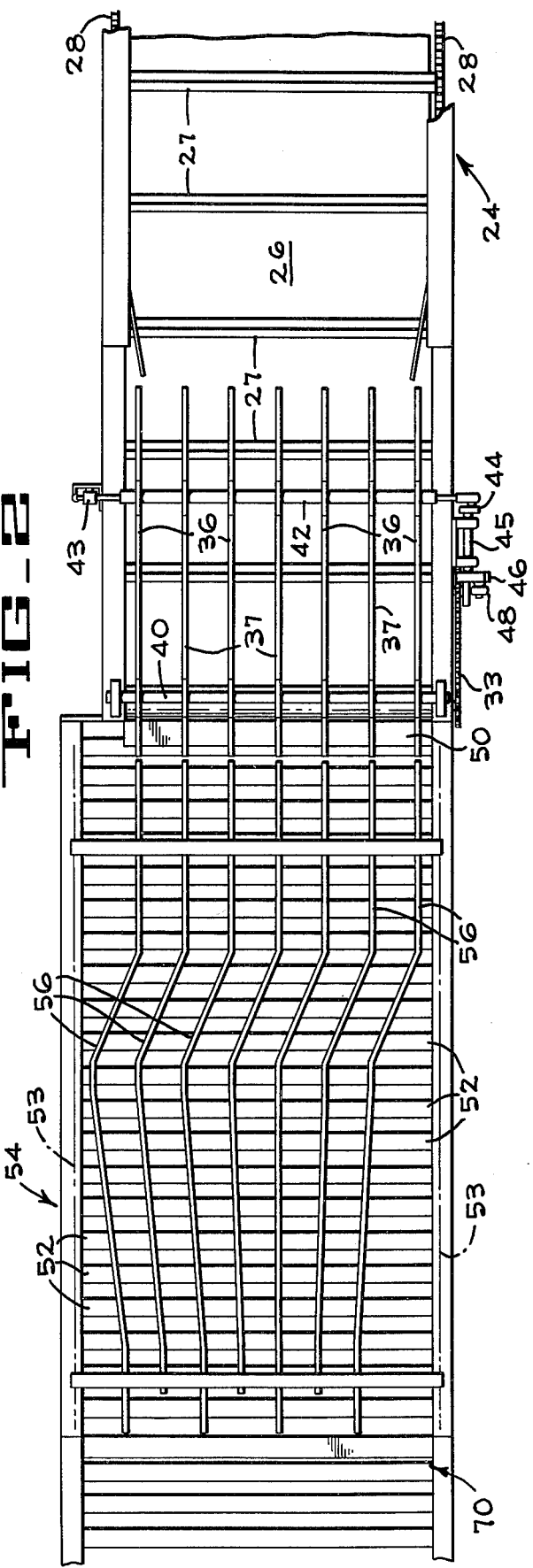
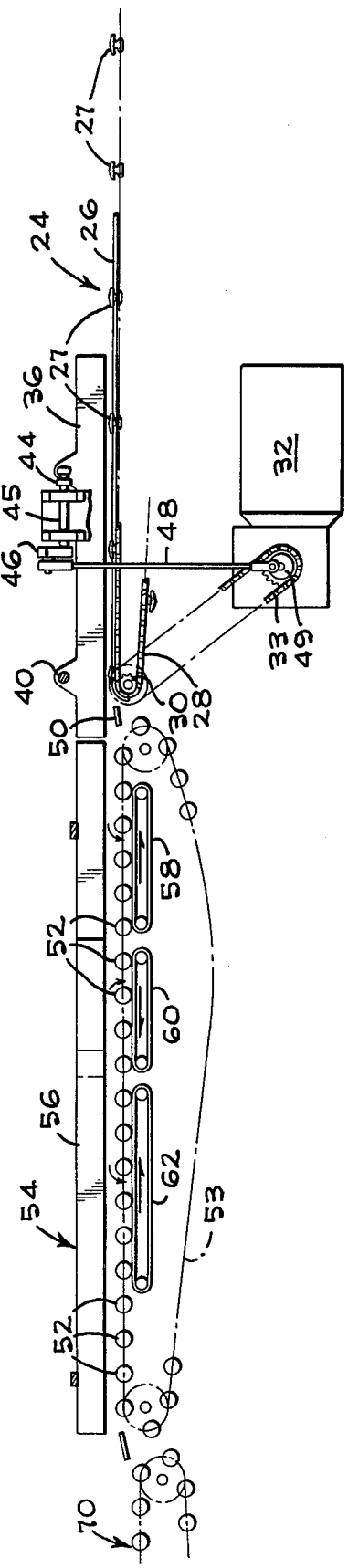

EGG HANDLING SYSTEM

BACKGROUND OF THE INVENTION

1. Field of the Invention

The present invention generally pertains to systems for handling eggs prior to the time that they are packed into cartons or other containers, and more particularly, it pertains to in-line egg handling systems wherein means are provided for automatically controlling the flow of and the processing operations performed upon eggs from the time that the eggs are laid by the chickens until their final packing for delivery to the marketplace.

2. Description of the Prior Art

In conventional egg handling systems, eggs are gathered at the ranch, are held in coolers (usually at about 55°F.) overnight, and are then graded and packed the next day. The cooling before grading and packing is done for the purpose of maintaining a high interior quality of the eggs. An egg of high interior quality is one that has a pleasing appearance, particularly in that the yolk is well rounded and high standing, rather than flattened. It is an egg with a large proportion of thick albumen, good height, and, obviously, an egg free of spoilage and foreign bodies. A great deal of the foregoing quality factors are dependent upon the age, breed, health, and management of the chickens; however, other factors affecting the interior quality of the eggs are directly dependent upon the means by which the eggs are handled immediately after they are laid and up until the time that they are packed.

The quality of an egg never surpasses that moment when it is first laid. It has been known for many years that this egg quality can be maintained in two ways: (1) by keeping the eggs cold, and (2) by oiling the eggs so as to retard the evaporation losses from the eggs. While it was at one time thought that the cooling and oiling were necessary solely to prevent moisture loss from the eggs, this assumption has been proven to be somewhat false. It has been learned that it is not the loss of moisture per se that affects egg quality, but rather, the loss of carbon dioxide. This carbon dioxide loss through the thousands of tiny pores in each egg results in an increased pH which causes a breakdown of several protein complexes and, eventually, a reduction in the thickness of the albumen. There also occurs a breakdown of the vitellin membrane with resultant flattening of the yolk.

From the foregoing, one would presume that by oiling the eggs and by keeping the eggs as cold as possible from the moment that they are laid, the interior qualities of the egg would be best preserved. This obvious conclusion does not apply, however, because of at least one very important factor. When eggs are first laid, the albumen has a very cloudy appearance. It is felt that this cloudy appearance is objectionable to the housewife, and, therefore, attempts have been made to clear this cloudiness prior to the delivery of the eggs to the marketplace. This is the primary reason why eggs are usually held overnight before packing. Also, this cloudiness creates problems in candling. Due to the opaqueness of the white of the egg, it is difficult for the candler to detect samll blood spots. It has been shown that the cloudy condition of the albumen is related to the pH of the egg. As the egg loses $CO_2$, with a resultant increase in pH, the cloudy condition will clear thus making the egg more acceptable to the housewife.

As previously pointed out, most systems hold eggs overnight after they have been gathered to allow for the clearing of the albumen. This means that the eggs must be handled twice before they are packed. That is to say, the eggs must first be gathered and placed in filler flats or the like and then moved into the cooling room, and on the next day, the eggs must be taken from the cooling room and delivered from the filler flats to the processing system where they are washed, graded, and packed.

With the trend toward mechanization in the egg handling industry, some systems for an in-line handling of the eggs from the time of lay to the time of packing have been devised. Such systems comprise, in series, a means for automatically gathering the eggs from the laying cages, means for transporting the eggs to an accumulating table where they are aligned and spaced for individual handling throughout the remainder of the system, a washing and drying mechanism, an oiling mechanism, a rapid cooling tunnel wherein the eggs are subjected to blasts of frigid air for periods of time of from five to fifteen minutes while they are continuously conveyed therethrough so as to cool the eggs down to an acceptable level for packing, and a conventional grading and packing machine. While such in-line egg handling systems have eliminated the double handling of the eggs necessitated by the conventional prior art methods mentioned hereinbefore, the egg quality is generally not maintained in as good a condition as is possible due to the necessity for maintaining continuous movement of the eggs through the system and the inability to control the conditions of the eggs at the various critical processing points in the system. Also, the relatively rapid cooling of the eggs after washing and drying results in a non-uniform cooling which promotes deterioration of the eggs and enlarged air cells both of which factors cause downgrading of the eggs by USDA standards.

SUMMARY OF THE INVENTION

With the system of the present invention, a means for the in-line handling of eggs from the time of lay to the time of packing is provided whereby a high level of egg quality is maintained throughout the system. The system is fully automated so that there is no individual handling of the eggs other than by the conventional operators who remove checked, bloody, or other eggs unfit for packing for one reason or another.

When the eggs are first collected, they are gathered in bulk and are passed through an aligning and orienting system so that they can be individually controlled thereafter. The next step in the egg handling process of the present invention is to apply a light oil spray to the eggs. The eggs are then washed, and, rather than being immediately dried in the conventional manner, they are conveyed for a period of time of at least thirty minutes through a cooling and conditioning room at a temperature of about 50°F. wherein final conditioning of the egg is achieved, i.e., wherein final clearing of the albumen and slight elevation of the pH thereof occurs. The eggs are then moved into a conventional grading and packing machine wherein they receive a second oiling, heavier than the first oiling, to seal the egg and preserve the quality thereof.

It is particularly important that the cooling of the eggs after washing be provided over a relatively long period of time (with an optimum time of about fifty minutes) in order to avoid the problems which accompany rapid cooling of the eggs wherein hot spots may be left at the center of the eggs which later cause rather rapid deterioration of the egg quality.

The gradual cooling of the eggs from the laying house to cartoning is one of the features of the present invention which makes the in-line system most effective in maintaining egg quality. Body heat is removed from the eggs over a period of 4–6 hours. Associated with the losss of heat will be a loss of carbon dioxide, a change in albumen pH, a general loss in albumen turbidity and, it is believed, a more rapid diffusion of blood from pinpoint clots. A loss of carbon dioxide eventually lowers internal quality, but this slight loss of quality is unavoidable and, it has been found, assures a better separation of the shell membrane in hard cooked (i.e., hard boiled) eggs.

Finally, the controlled release (through oiling) of the carbon dioxide gas from the egg is an important feature of the invention, and it is desirable that this oiling be carried out in two stages with a light oiling prior to final cooling and conditioning and a heavier oiling just prior to packing.

BRIEF DESCRIPTION OF THE DRAWINGS

FIGS. 1A and 1B, when combined, are a schematic plan of the in-line egg handling system of the present invention.

FIG. 2 is an enlarged diagrammatic plan of a portion of the egg accumulator and aligner and the egg orienter of the present invention.

FIG. 3 is a diagrammatic side elevation of the apparatus shown in FIG. 2.

DESCRIPTION OF THE PREFERRED EMBODIMENT

Referring now more particularly to the drawings, FIGS. 1A and 1B represent schematically the in-line egg handling system of the present invention with the arrows thereon indicating the direction of travel of the eggs through the system. As is conventional, aligned pairs of cages 10 are positioned adjacent transfer conveyor belts 12. Each of the cages is adapted to contain from approximately six to eight chickens, and the cages are inclined slightly so that the eggs, when laid, will roll down onto the centrally located conveyor belt 12. While FIG. 1A, for the purposes of illustration, shows only two conveyor belts 12, it will be understood that a considerable additional number of belts may be provided in parallel with those and that each belt may have a considerable number of pairs of laying cages 10 aligned therewith.

When the belts 12 are moved in the direction of the arrows thereon, the eggs are diverted at the ends thereof, by means of diverter members 13, onto aligned pairs of endless rollers, or spool, conveyors 14 which individually carry the eggs to a main transport conveyor 16 of the endless belt type. In the system of the present invention it is desirable to have the main conveying belt 16 operating continuously during the hours in which eggs are to be packed. Thus, in order to assure a more or less unifrom flow of eggs to the processing system, the habits of the chickens in the cages 10 which feed the conveyor belts 12 should be controlled so that different belts 12 can be driven at different times when they contain a full supply of eggs. This poses an additional problem of regulating the laying of the eggs by the chickens so that there will be a substantially constant and continuous supply of eggs during the time that the eggs are to be packed. It is well known that the time of day that the birds will lay at their maximum rate is directly related to the time which they receive light. The present practice for lighting the birds is to provide a 4/10 light/dark day. It has then been shown that birds will generally have their peak production periods some four hours after the dark/light interface. Also, it has been shown that birds under complete environmental control can be trained to have this peak production period at any hour during the 24 hour day.

Each belt 12, or series of belts in one hen house, should therefore be provided with means for driving the belt to feed the eggs therefrom onto the main transport conveyor 16 only at selected times. As pointed out hereinbefore, it is desirable to provide a time for the albumen of the eggs to clear prior to the processing of the eggs. It has been found that the optimum time for such clearing at ambient temperatures is about six hours from the time that the egg is laid until it is first oiled in the processing system just prior to washing. The temperature of the egg at the time of lay is approximately 105°F. and this temperature will drop to somewhere in the range of from 70 to 80°F. depending upon the ambient temperature conditions during this initial holding period while the pH of the albumen will rise from about 7.7 to about 8.2. Assuming that it takes about an hour to move the eggs from a conveyor belt 12 to the first oiling mechanism, then any given conveyor belt 12 should be started about five hours after the point of peak lay of the chickens in the cages 10 adjacent to that belt. Since there will be a considerable number of belts in the different hen houses aligned and feeding into the main conveyor 16, these belts can be started at different times corresponding to different peak laying periods of the chickens in the various hen houses so that the main conveyor 16 will have a generally constant supply of eggs. That is to say, by staggering the lighting conditions of the various hen houses (and thereby staggering the peak laying periods of the chickens in these hen houses) different belts 12 will receive eggs at different times of the day; thus, the supply of eggs can be maintained by selective driving of the various belts 12.

From the main transport conveyor belt 16 the eggs are transferred to an overlying cross conveyor belt 18 to which they are diverted by means of a curved guide member 17. The cross conveyor 18 carries the eggs to an accumulator and aligner mechanism 24. The eggs are diverted onto the accumulator 24 by means of curved, divertiing members 20 and 21 which are positioned at the center and edge portions of the conveyor belt 18, respectively, so as to provide a generally even distribution of eggs across the width of the accumulator.

The structure of the accumulator and aligner mechanism 24 is shown in FIGS. 2 and 3 and will be seen to comprise a flat fixed deck 26 of polyvinylchloride (or similar material) over which a plurality of uniformly spaced slats 27 are arranged to ride. The slats are generally triangularly shaped (FIG. 3) so that they will push eggs along the face of the deck, but they are of a shallow enough height so that they can move under the eggs once the eggs begin to accumulate at the downstream end of the deck. Each slat is connected at its ends to a pair of conveyor chains 28 which are trained around sprockets 30 (only one of which is shown in FIG. 3) and which are driven by a motor 32 through a drive chain 33.

At the end of the accumulator and aligner mechanism 24 there are provided a plurality of uniformly spaced and aligned plates 36 and 37 with the plates 37 being alternately spaced between the plates 36 and extending slightly further upstream over the accumulator deck 26. The plates 36 and 37 are pivotally supported at their downstream end upon a shaft 40 which extends across the accumulator and aligner mechanism and is attached to the frame structure thereof. The upstream end of the plates 36 and 37 are attached to a shaft 42 which is provided with a spring connection 43 at one end thereof so that it can move laterally and which is provided at the other end thereof with a pivotable connection to a short crank member 44 which is attached to a shaft 45 that is, in turn, connected to a crank 46. The latter crank member 46 is rotatably connected to an elongated crank arm 48 which is reciprocated by means of a crank plate 49 driven by the motor 32. Thus, the shaft 42 supporting the upstream ends of the plates 36 and 37 is adapted to attain a slight lateral and vertical reciprocatory motion as the crank arm 48 is reciprocated. This allows the eggs to filter individually into the spaces between the plates 36 and 37 and prevents bridging at the upstream end thereof. It should be pointed out that the plates 36 and 37 are spaced apart by a distance such that the eggs will be singulated therebetween.

At the end of the accumulator and aligner mechanism 24, the eggs pass over a short transfer shelf 50 and are arranged to be received upon a plurality of rollers 52 carried between a pair of continuously-driven endless conveyor chains 53 comprising the conveyor for an egg orienter mechanism 54. Overlying the rollers 52 (which are comprised of 1⅛ inch diameter vinyl covered aluminum tubes spaced at two inch centers) are a plurality of plates 56 which are aligned at their upstream ends with the plates 36 and 37 of the aligner and accumulator mechanism so that the eggs will be individually transferred into the valleys between each of the conveyor rollers 52. In the upstream portion of the orienter an underlying belt 58 is provided to drive the rollers 52 in a counterclockwise direction (as seen in FIG. 3). This motion automatically makes each egg move in the direction of the small end of the egg in accordance with well known egg orienting principles as taught in the prior U.S. Patent to Rostron 2,895,589, for example. In a second portion of the orienter, an underlying belt 60 is provided which is rotated in a direction opposite to that of the belt 58 and which is moved at the same speed as that of the conveyor chains 53 carrying the conveyor rollers 52 so that the rollers 52 will be stopped from rotating. The overlying plates 56 in this second portion of the orienter are angled across the conveyor so that the misoriented eggs, i.e., those with their small ends pointing to the left looking in the downstream direction, will engage the stationary face of the plates 56 and be caused to flip over. In the final section of the orienter, a third underlying belt 62 is provided to again rotate the rollers 52 in the counterclockwise direction to stabilize and move the eggs down into the exit lanes for transfer to a conventional grooved roller or spool type conveyor 70. In this conveyor the eggs will be received in rows and in uniformly spaced positions within pockets between each of the grooved rollers. Such a conveyor is shown, for example, in the Patent to Rose et al. 3,252,607 and reference to this patent may be had for the details thereof. The eggs will now be arranged in a uniform pattern which they will maintain until they reach the final grading process.

As the eggs are progressed along upon the pocketed roller conveyor 70 in a horizontal orientation they are rotated slowly by the rollers and they are arranged to be moved under an egg oiler 72 wherein a light coating of oil is applied to the entire surface thereof by overhead spray nozzles. This oiler may be of a conventional type such as, for example, the egg oilers manufactured by Sailor Equipment, Inc. of Adrian, Minn. It is desirable at this time (which should preferably occur about 6 hours after the laying of the eggs) to apply only a light coating of oil to the eggs at a rate of approximately 1 gallon to each 288,000 eggs so as to close the pores of the eggs before they are washed to prevent undue evaporation or $CO_2$ losses under the heated conditions of the washer. It is also desirable at this point to provide an operator to remove any cracked or leaking eggs to prevent them from contaminating the washer.

From the oiler 72, the eggs are conveyed by the pocketed roller conveyor 70 through a washer 74 which may be of the type as shown in prior U.S. Pat. 3,296,641 to Rose et al. This washer includes the important features of spraying, brushing, water agitation, and the application of a detergent-sanitizer to the egg shells. The temperature of the water in the washer should be maintained at least twenty degrees above the interior egg temperature, and an approved detergent formula should be used in the washer preferably one high in tripolyphosphates and low in carbonates and sulphates. The detergent formula should contain a silicate, a low foaming wetting agent and a chlorine sanitizer. The detergent solution should have a pH of around 10.0 and a minimum chlorine content of 100 ppm. It should also be recognized that certain dissolved minerals in the processing plant water may affect the shell washing operation. The carbonates of calcium and magnesium are particularly troublesome. If these impurities exist in the wash water they should be removed by the addition of a water softener to the wash water. Any water with a hardness in excess of 12 grains per gallon (205 ppm) should be softened to a level of 3 to 6 grains per gallon (51 to 102 ppm). The water supply should also be analyzed for iron content for two reasons. First, iron compounds cause a shell straining problem and secondly, (and more importantly) bacterial spoilage from pseudomonas infection (green rot) will occur with water containing 0.5 ppm or more of dissolved iron. With the internal temperature of the eggs at this time expected to be the range of from about 70°F. to about 80°F. the wash water should be at a temperature in the range of from about 90°F. to about 100°F., and the rise in internal temperature of the egg due to washing should be limited to about 5°F.

Once the eggs are washed and the dirt and other extraneous matter removed therefrom, the conveyor 70 will transfer the eggs into a cooling and conditioning room 76 at a temperature of approximately 50°F. where they will be allowed to dry naturally for a period of time of preferably from 45 minutes to an hour with an optimum cooling time of around 50 minutes. It is believed to be essential that at least thirty minutes of cooling be provided at this time in order to allow for final clearing of the albumen and to slowly reduce the internal temperature of the eggs to the desired level for packing. The egg cooling conveyor which transfers the eggs from the pocketed roller conveyor 70, cools the eggs to a temperature in the range of from 60°F. to about 65°F., and transfers the eggs to a second pocketed roller conveyor 72, is shown and fully described in the copending patent application of Boyd W. Rose, Ser. No. 205,154 (now Continuation Application Ser. No. 427,741), filed on even date herewith and assigned to the assignee of the present application. Reference to this patent application may be had for further details of the structure of the egg cooling and conditioning room and, particularly, the egg cooling conveyor.

The pocketed roller conveyor 72 (which may be identical to the conveyor 70) then carries the eggs into a conventional grading and packing machine 80 wherein the eggs are weighed (i.e., graded) and placed in cartons or filler flats at various stations along the machine depending upon the grades assigned thereto. An operator O' standing upon a platform 83 inspects the eggs as they pass over a candling light 84 and removes the bloody or substandard eggs. The remaining eggs are discharged into individual cups of an endless chain transfer conveyor 86 which delivers the eggs into a weighing unit 87 comprising three scales, each of which is adapted to receive and weigh different eggs and deposit them on an endless chain bucket conveyor, indicated by a centerline 88. The upper run of conveyor 88 moves in the direction of arrow 89 and carries the eggs in single file past an automatic blood spot detector 90 (which may be of the type disclosed in U.S. Pat. No. 3,031,077 to Harold J Mumma et al.) and a second egg oiler 91 comprised of an overhead spray nozzle which directs an oil spray down on the large ends of the eggs as they pass therebeneath in the bucket conveyor. At the oiler 91 the eggs are subjected to a relatively heavy oiling of approximately 1 gallon of oil per every 180,000 eggs. This seals in the final quality of the eggs just prior to cartoning.

The eggs are carried by the conveyor 88 in single file past eight cartoning stations which are indicated by phantom lines S1–S8. At each station, a carton or filler flat is automatically removed from a supply hopper H and moved beneath the bucket conveyor so that an egg, having the particular grade assigned to that station, can be discharged thereto. In the grading and packing machine 80 shown in FIG. 1B, an arrangement is illustrated wherein stations S1–S3 are arranged to pack filler flats, and stations S4–S8 are arranged to handle cartons of the usual type adapted to receive a dozen eggs and store them in two rows with six eggs in each row. When the flats have been filled at stations S1–S3, they are moved by appropriate conveying means onto a flat apron 92 where they are within easy reach of an operator O'' who places the filled flats in shipping cases C' positioned on a flat platform 93. When a carton has been filled at any of the stations S4–S8, it is automatically moved onto an endless belt conveyor 94 which carries the carton through a closing unit 95 and moves it onto a rotating disc 96. The disc reverses the direction of movement of the carton, rotates it 90°, and deposits it on a second endless belt conveyor 97, in a position generally transverse to the belt, as indicated by carton C'', for conveyance in the direction of arrow 98 to a second apron 99 within reach of the operator O''.

When a shipping case C' has been filled, the operator slides the case to the end 93A of platform 93 and shifts it to a take-away conveyor 100.

The transfer conveyor 86, the weighing unit 87, the bucket conveyor 88, the mechanisms at the egg cartoning stations S1–S8, and the closing unit 95 may be of the type disclosed in the U.S. Patents to Mumma, No. 2,895,274, No. 2,909,880, and No. 3,225,948. Reference to these patents may be had for a complete disclosure of such mechanisms. The means by which the eggs are transferred from the pocketed roller conveyor 72 to the transfer conveyor 86 is shown in the aforementioned U.S. Patent to Rose et al., 3,252,607.

It is desirable to have about a 4 to 6 hour optimum time period from the time of the laying of the eggs to the time that the eggs are delivered to the first egg oiler 72 under average conditions of temperature and humidity. This time period will permit the egg albumen to reach an acceptable level of turbidity without the egg suffering a serious loss in Haugh unit quality. Then there is approximately another hour during which the eggs are in the processing system with about 50 minutes of this time being spent by the eggs in the cooling and conditioning room 76 where the eggs are cooled from a temperature in the 75°F.–85°F. range to a temperature in the 55°F.–65°F. range. After grading and the final oiling, the eggs are packed and are delivered into a cold room which is kept at a constant temperature of around 40°F., where the packaged eggs await delivery to the marketplace.

Under the in-line handling conditions given, it has been determined by tests that the Haugh unit losses in the eggs during the handling of the eggs by the processing system in both very cold months (where the average internal temperature of the eggs delivered to the first oiler was in the 60°–65°F. range) and the very hot months (where the average internal temperature of the eggs delivered to the first oiler was in the 80°–90°F. range) were about the same and included losses of only from 1–3 Haugh units through packing and delivery to the cold room. Haugh unit quality of the eggs delivered from the hen houses after the average holding period of 4–6 hours also proved to be high with all of the egg samples tested being over the Grade AA standards as set by the USDA.

Although the best mode contemplated for carrying out the present invention has been herein shown and described, it will be apparent that modification and variation may be made without departing from what is regarded to be the subject matter of the invention.

What is claimed is:

1. An in-line egg handling system comprising a bulk conveyor means for automatically gathering eggs from the locations where they are laid, accumulating and aligning means where receiving eggs from said bulk conveyor means and for placing said eggs in a uniform arrangement, means for continuously conveying said eggs while they remain in said uniform arrangement, means for applying a first light coating of oil to the surface of said eggs, means for washing said eggs after said application of said first coating of oil, means for cooling said eggs to an internal temperature in the range of from about 55°F. to about 65°F., means for applying a second light coating of oil to said eggs following the cooling thereof, and means for grading and packing said cooled eggs.

2. An in-line egg handling system according to claim 1 wherein said cooling is accomplished over a period of time of at least 30 minutes without the use of forced drafts of air at freezing temperatures.

3. An inline egg handling system according to claim 2 wherein said cooling is accomplished over a period of time of from about 45 minutes to about 60 minutes.

4. An in-line egg handling system according to claim 2 wherein said eggs are delivered immediately from said washing means to said cooling means whereby the eggs are allowed too dry naturally while they are in said cooling means.

5. An in-line egg handling system according to claim 1 wherein substantially more oil is applied to said eggs by said second oiling means than is applied by said first oiling means.

6. An in-line egg handling system according to claim 1 wherein said washing means is provided with wash water at a temperature of about 20°F. higher than the average internal temperature of the eggs entering said washing means.

7. An in-line egg handling system according to claim 1 including means for aligning and orienting said eggs while they are in said uniform arrangement so that all of the large ends of the eggs are oriented in the same direction.

8. An in-line egg handling system comprising means for accumulating and conveying eggs from the locations where they are laid, means for receiving said eggs from said accumulating and conveying means and for washing said eggs, means for cooling said eggs immediately following the washing thereof, transport means for continuously conveying said eggs through said washing means and said cooling means, and control means for said transport means for controlling the rate of movement of the eggs through said cooling means with respect to the length of said transport means within said cooling means so that each egg is cooled for a period of time of at least 45 minutes as it moves through said cooling means so as to reduce the internal temperature of the egg to a temperature in the range of from about 50°F. to about 65°F., and means arranged to continuously receive the eggs from said transport means for grading and packing said eggs following the cooling thereof.

9. An in-line egg handling system according to claim 8 including means for applying a light coating of oil to the shell surface of said eggs.

10. An in-line egg handling system comprising means for accumulating and conveying eggs from the locations where they are laid, means for receiving said eggs from said accumulating and conveying means and for washing said eggs, and means for cooling said eggs immediately following the washing thereof for a period of time of at least 45 minutes so as to reduce the internal temperature of the egg to a temperature in the range of from about 50°F. to about 65°F., means for grading and packing said eggs following the cooling thereof, a first means for applying a light coating of oil to said eggs prior to the washing thereof, and a second means for applying a light coating of oil to said eggs following the cooling thereof.

* * * * *

UNITED STATES PATENT OFFICE
CERTIFICATE OF CORRECTION

PATENT NO. : 3,882,769
DATED : May 13, 1975
INVENTOR(S) : JOHN R. WEBER ET AL

It is certified that error appears in the above-identified patent and that said Letters Patent are hereby corrected as shown below:

ON FIRST PAGE OF THE LETTERS PATENT THE ASSIGNEE WAS LEFT OUT. SHOULD BE: --Assignee FMC Corporation, San Jose, Calif.--.

Column 1, line 65, "samll" should be --small--.

Column 2, line 8, "the" (second occurrence) should be --a--.

Column 3, line 13, "losss" should be --loss--.

Column 3, line 59, "rollers" should be --roller--.

Column 3, line 65, "unifrom" should be --uniform--.

Column 4, line 10, "4" should be --14--.

Column 4, line 54 "divertung" should be --diverting--.

Column 6, line 50 "straining" should be --staining--.

Column 8, line 6, "58," should be --S8,--.

Column 9, line 5, "inline" should be --in-line--.

Column 9, line 11, "too" should be --to--.

Signed and Sealed this second Day of March 1976

[SEAL]

Attest:

RUTH C. MASON
Attesting Officer

C. MARSHALL DANN
Commissioner of Patents and Trademarks